United States Patent [19]

Srivastava

[11] 4,335,403

[45] Jun. 15, 1982

[54] HORIZONTAL COUNTDOWN SYSTEM FOR TELEVISION RECEIVERS

[75] Inventor: Gopal K. Srivastava, Buffalo Grove, Ill.

[73] Assignee: Zenith Radio Corporation, Glenview, Ill.

[21] Appl. No.: 223,611

[22] Filed: Jan. 9, 1981

[51] Int. Cl.³ ............................................. H04N 5/04
[52] U.S. Cl. ................................................. 358/148
[58] Field of Search ................................ 358/148, 150

[56] References Cited

U.S. PATENT DOCUMENTS 4,278,994  7/1981  Van der Valk ........................ 358/25

Primary Examiner—Robert L. Richardson

[57] ABSTRACT

A horizontal countdown system is described for developing horizontal scan drive pulses in a color television receiver. The system includes a counter for counting the cycles of a color oscillator signal, various decoders for sensing the state of the counter, and a gate coupled to a selected one of the decoders for developing a horizontal scan drive pulse and for resetting the counter. Also included is a detector for sensing when a non-standard signal is received and when a dynamic phase error exists between composite sync and the receiver's flyback pulse. Depending on the extent and direction of any dynamic phase error, one or more of the decoders are successively coupled to the gate to reduce the phase error. When a non-standard signal is sensed, an analog phase locked loop generates phase-corrected pulses which are coupled to the gate to develop horizontal scan drive pulses until the presence of a standard signal is sensed.

14 Claims, 9 Drawing Figures

HORIZONTAL COUNTDOWN SYSTEM FOR TELEVISION RECEIVERS

BACKGROUND OF THE INVENTION

This invention is directed generally to improvements in television receivers. It is particularly directed to a horizontal countdown system for developing horizontal rate pulses from a color oscillator signal.

In recent years, attempts have been made to replace much of the analog circuits in television receivers with digital circuits. For example, the conventional analog circuits for developing vertical rate pulses have, in some receivers, been replaced by a digital vertical countdown system. In receivers using such a countdown system, the vertical oscillator is eliminated and the horizontal oscillator is modified to produce horizontal rate pulses whose frequency is twice the normal (15.73 kilohertz) horizontal frequency. These higher frequency horizontal rate pulses are commonly referred to as "2H" pulses, and they are divided or "counted down" by a constant factor to develop vertical rate pulses. To drive the receiver's horizontal scan at the nominal 1H rate, the 2 H pulses are merely divided by a factor of 2.

To further digitize television receivers, it has been proposed that a horizotnal countdown system be included to develop the 2H pulses. In this approach, the color oscillator is used as a reference, and its frequency is divided or counted down to develop the 2 H pulses. The latter pulses are then counted down by a conventional vertical countdown system to provide vertical rate drive.

The prior art has taken the following approach to implement a horizontal countdown system. The color oscillator is modified to operate at a frequency of 4Fc (four times the nominal color subcarrier frequency of 3.58 megahertz). A counter counts the 4Fc pulses developed by the color oscillator, and a decoder senses when the counter has reached a count of 455. When that occurs, the decoder develops an output pulse and resets the counter to begin counting anew. Each time the counter reaches a count of 455, the decoder develops another output pulse. These output pulses occur at a frequency of 2H and are divided by two to drive horizontal scan. They are also input to a vertical countdown system to drive vertical scan.

One problem with the approach described above occurs when the transmitted television signal does not include a color burst. Under this condition, the receiver's color oscillator becomes free running, and the decoder's output does not remain locked to 2 H. Consequently, vertical and horizontal synchronization is lost between the receiver's scan and the transmitted signal.

Another problem occurs when the signal applied to the receiver is developed by a non-standard signal source, such as a television video game, a television playback device or the like. Such devices do not always output a signal whose color frequency and horizontal frequency are locked to each other according to the NTSC standard. Hence the decoder's output may not be developed in synchronism with the horizontal sync pulses which are received from the non-standard signal source.

To overcome this problem, the prior art employs a detector to sense the lack of synchronism and to modify the operation of the decoder (or the counter) so that the decoder develops an output pulse on a count different from 455. Because the decoder (or the counter) cannot be easily modified to operate at a count which differs from 455 other than by an integer or a multiple of an integer, it is still difficult to achieve exact synchronism. For example, the incoming television signal may require that the decoder develop an output pulse at a count of 455.4. Under this condition, the decoder may develop an output pulse on a count of 455 during one line, and develop another output pulse on a count of 456 during the next line. This creates a phase error between the decoder's output and the incoming horizontal sync pulses. The magnitude of the phase error can be reduced by increasing the frequency of the color oscillator, but precise phase synchronization is still difficult to achieve.

For the foregoing reasons, digital horizontal countdown systems have not been used in television receivers. The present invention overcomes those problems in a manner which makes it commercially feasible to replace a receiver's analog horizontal system with a digital horizontal countdown circuit.

OBJECTS OF THE INVENTION

It is a general object of the invention to provide an improved digital horizontal countdown system for a television receiver.

It is a more specific object of the invention to provide a horizontal countdown system which generates phase synchronized outputs, even when the receiver's signal is provided by a non-standard signal source or when the signal includes no color burst.

It is another object of the invention to provide a horizontal countdown system which eliminates the horizontal oscillator used in conventional receivers.

BRIEF DESCRIPTION OF THE FIGURES

The objects stated above and other objects of the invention are set forth more particularly in the following detailed description and in the accompanying drawings, in which.

DESCRIPTION OF THE PREFERRED EMBODIMENT

Figure 1:
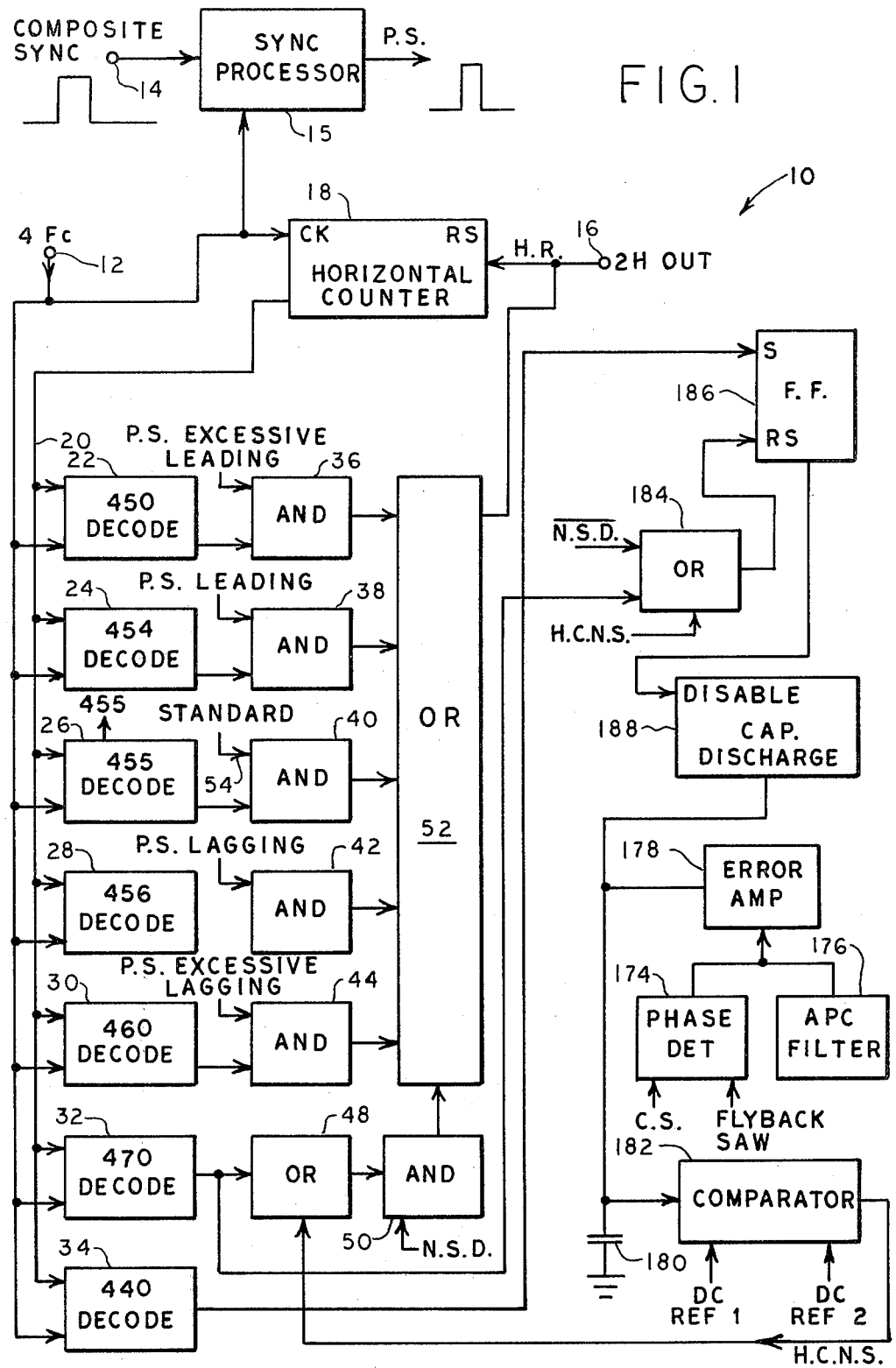
FIG. 1 illustrates a portion of a horizontal countdown system according to the invention.

Referring to FIG. 1, the major portion of a preferred embodiment of the present horizontal countdown system 10 is shown for use in a television receiver. The illustrated system includes an input terminal 12 receiving a signal indicated as 4Fc whose frequency is four times the nominal frequency of the color subcarrier, i.e., four times 3.58 megahertz. Another input terminal 14 receives the composite sync (C.S.) pulses and couples those pulses to a sync processor 15. The latter device develops a relatively narrow P.S. (processed sync) pulse which is representative of composite sync and which is used to determine whether the composite sync is part of a standard television signal or a nonstandard television signal. It is also used to determine the amount of phase error, if any, between the composite sync and the receiver's flyback pulse (not shown).

The output of the system is at a terminal 16 at which 2H pulses are developed. Those pulses are referred to herein as "horizontal scan drive pulses" and may be applied to a conventional divide-by-two counter (not shown) to generate 1H pulses, from which flyback pulses may be derived in a conventional manner and from which the receiver's horizontal/scan is driven. The 2H pulses are also preferably applied to any suitable vertical countdown system (not shown) to develop vertical rate pulses for driving the receiver's vertical scan.

The 4Fc pulses at the input terminal 12 are applied to the clock input of a conventional counter 18. An address buss 20 carries signals representative of the count in the counter 18 to a series of decoders 22, 24, 26, 28, 30, 32 and 34. The output of each of the decoders 22 through 30 is applied as an input to AND gates 36-44, respectively. The output of the decoder 32 is coupled via an OR gate 48 to another AND gate 50. The outputs of AND gates 36-44 and 50 are all applied to an OR gate 52, the output of which constitutes the 2H pulses present at terminal 16. Those pulses are also used as a H.R. (horizontal reset) signal to reset the counter 18.

Assume now that the signal received by the receiver is a standard signal, i.e., it includes a color burst and there is no dynamic or static phase error between the P.S. (processed sync) pulse and the receiver's flyback pulse. In this condition, the counter 18 reaches a count of 455 when a 2H pulse should be generated. (This assumes, of course, that the standard signal is an NTSC signal. For television signals such as PAL, a 2H pulse would be generated at a different count.) The decoder 26 is selected to sense the 455 state of the counter 18 and to develop an output pulse when that state is reached. The AND gate 40 is enabled by a "standard"signal received from other circuitry via a lead 54. It then outputs the decoder's pulse to the OR gate 52 for developing a 2H pulse at terminal 16. The counter 18 is reset by that 2H pulse and begins counting additional 4Fc pulses received from terminal 12. If the television signal remains "standard", the decoder 26, the AND gate 40, and the OR gate 52 continue to develop a 2H pulse each time the counter 18 reaches a count of 455.

The operation described above is largely conventional for the condition when a "standard" signal is received. The discussion below explains how the system reacts to a "non-standard" television signal and to phase errors which occur between the receiver's flyback pulse and the P.S. (processed sync) pulse. In that discussion, symbols are used to identify various signals which are generated by the system. The table below identifies those symbols:

TABLE OF SYMBOLS

C.S. = Composite Sync
P.S. = Processed Sync
H.R. = Horizontal Reset
I.P. = In Phase Signal
O.P. = Out of Phase Signal
I.P.N.S. = In Phase Non-Standard Signal
O.P.N.S. = Out of Phase Non-Standard Signal
N.S.D. = Non Standard Detected
O.P.D.D. = Out of Phase Detected Dynamic
S.D. = Standard Detected
H.C. N.S. = Horizontal Correction Non-Standard Other than the standard or nominal operating condition described above, two other conditions may occur. A dynamic phase error condition occurs when a dynamic phase error exists between the receiver's flyback pulse and incoming sync. The presence of such an error is determined in part by comparing the phase of the center of the flyback pulse to the phase of the P.S. pulse developed by the sync processor 15. Appropriate corrections are then made to eliminate the dynamic phase error. If that error cannot be corrected, it is assumed that a non-standard signal is being received and different steps are taken to achieve synchronization. The latter situation is referred to herein as a non-standard condition. Before describing how the P.S. pulse is used to determine the presence of a phase error, the sync processor 15 will be described.

Figure 2:
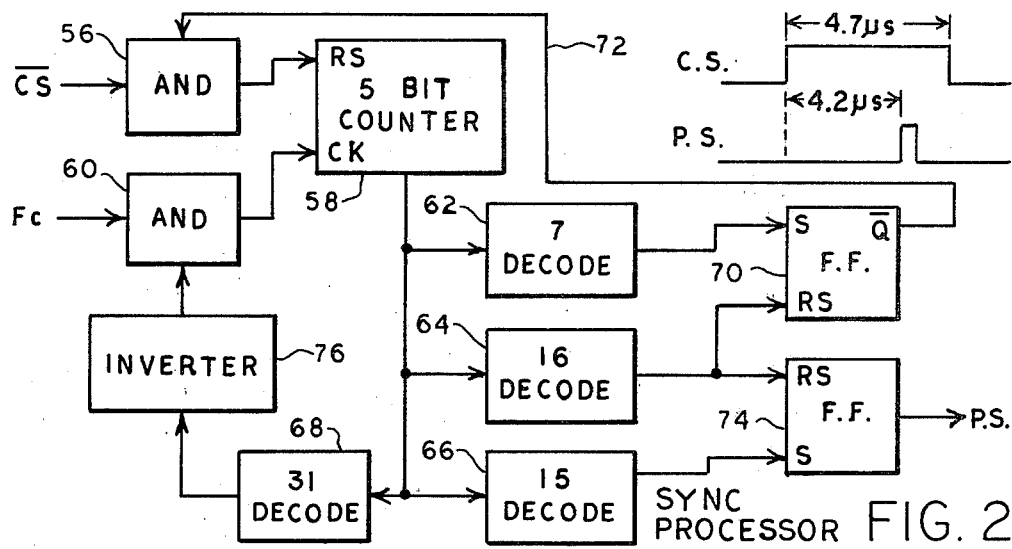
FIG. 2 shows a preferred embodiment of the sync processor of FIG. 1.

Referring to FIG. 2, the illustrated embodiment of the sync processor includes an AND gate 56 which couples a $\overline{CS}$ (not composite sync) pulse to the reset input of a conventional five bit counter 58. Another AND gate 60 couples Fc pulses (3.58 megahertz) to the clock input of the counter 58. When the leading edge of a composite sync pulse occurs, AND gate 56 removes the reset from the counter 58 so that it starts counting the Fc pulses.

The state of the counter 58 is sensed by a 7 count decoder 62, a 16 count decoder 64, a 15 count decoder 66, and a 31 count decoder 68. Thus, when the counter 58 reaches a count of 7 (after about 1.9 microseconds), the decoder 62 develops an output which is applied to the set input of a flip-flop 70. The $\overline{Q}$ output of the flip-flop 70 is driven low and is coupled via a lead 72 to the AND gate 56. The gate 56 is thus held low so that the counter 58 keeps counting even if noise drives the $\overline{CS}$ signal positive. This provides a 1.9 microsecond interval in which to determine that the $\overline{CS}$ input is an actual sync input rather than noise. If it had been noise, the $\overline{CS}$ input would normally have gone high before 1.9 microseconds had elapsed to reset the counter 58.

When a count of 15 is reached, the decoder 66 sets a flip-flop 74 whose output goes high to initiate the P.S. pulse. When a count of 16 is reached, the decoder 64 resets flip-flop 74, thereby terminating the P.S. pulse. The flip-flop 70 is also reset at this time.

With this arrangement, the P.S. pulse is delayed from the C.S. pulse by an interval of about 4.2 microseconds. This delay is included to ensure that the P.S. pulse is centered with respect to the flyback pulse under normal operating conditions, thereby accounting for the usual phase offset between the flyback pulse and a composite sync pulse .

When a count of 31 is reached (after about 8.6 microseconds), the decoder 68 develops a high level output which is inverted by an inverter 76. The inverted signal is applied to the AND gate 60 to disable it so that no more Fc pulses reach the counter 58 until it is reset again by the termination of the $\overline{CS}$ pulse. This is done to ensure that the counter 58 does not keep counting when it receives wide $\overline{CS}$ pulses which occur during field sync intervals.

It is not critical that the decoder 68 senses a count of 31. It could as well sense other counts as long as the counter 58 is disabled after an interval during which a normal CS pulse should have ended.

Figure 3:
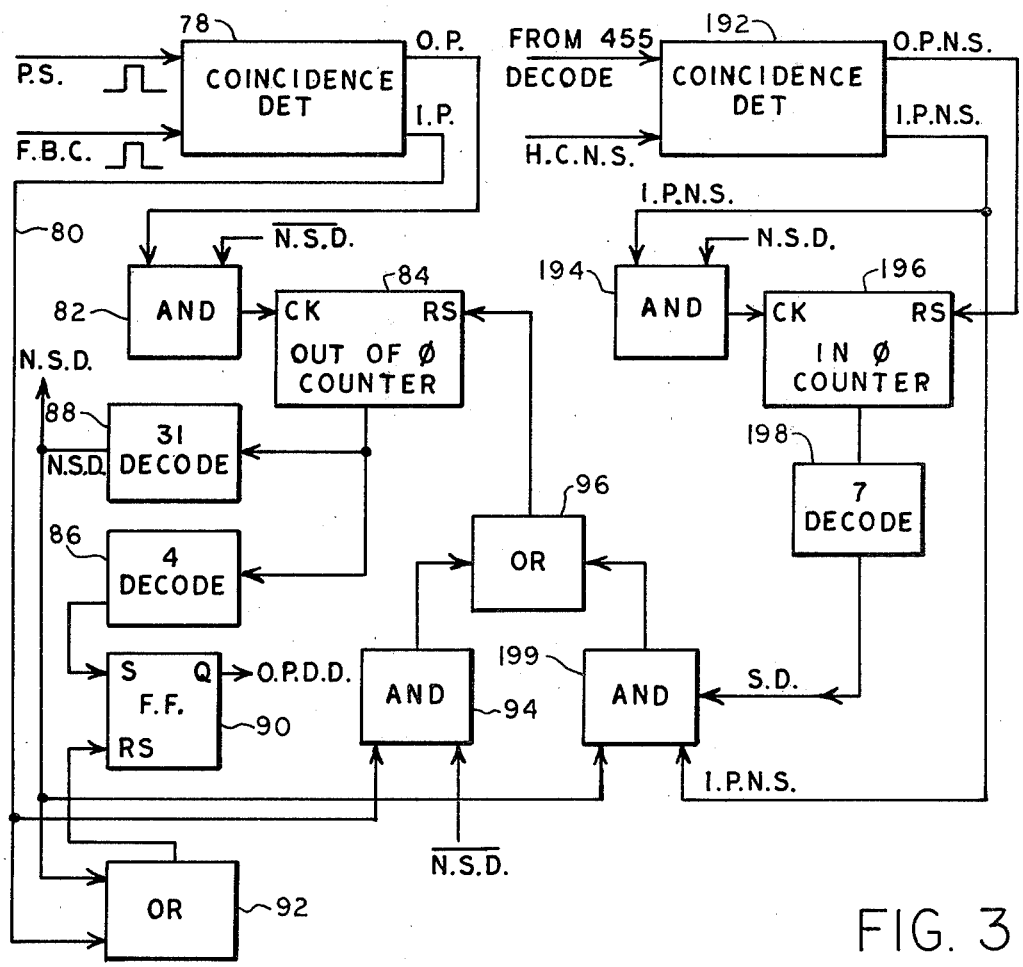
FIGS. 3 and 4 illustrate additional portions of the horizontal countdown system.

Referring now to FIG. 3, a conventional coincidence detector 78 is shown which receives the P.S. pulse and an F.B.C. (flyback center) pulse. The generation of the latter pulse is described below. Suffice it to say at this point that the F.B.C. pulse is a relatively narrow pulse which occurs at the center of the flyback pulse.

When the detector 78 senses coincidence between F.B.C. and P.S., it generates an I.P. (in phase) signal on a lead 80. When I.P. is present, the receiver's flyback pulse is known to be properly locked to incoming composite sync pulses.

Should a dynamic phase error occur or should a standard signal change to a non-standard signal, the detector 78 will sense a lack of coincidence between P.S. and F.B.C. and generate an O.P. (out of phase) signal. That signal is applied to an AND gate 82, the other input thereto being $\overline{\text{N.S.D.}}$. Because a non-standard signal condition has not yet been determined as present, $\overline{\text{N.S.D.}}$ is high. Consequently, the AND gate 82 is enabled to clock a conventional "out of phase" counter 84.

The state of the counter 84 is sensed by a 4 count decoder 86 and a 31 count decoder 88. Thus, when the counter counts four consecutive O.P. pulses, the output of the decoder 86 goes high. That output sets a flip-flop 90 whose Q output (O.P.D.D.) goes high to signal that a dynamic phase error has been detected. Such phase errors may occur, for example, when a large load is placed on the flyback pulse so that its phase changes. A dynamic phase error may also occur as a result of a change in the phase of the incoming composite sync. Of course, if no phase error exists, the O.P. signal remains low to disable the AND gate 82 and to maintain the counter 84 in a zero count state. When a dynamic phase error exits, the O.P.D.D. signal is coupled to circuitry described below to eliminate the phase error. If the phase error cannot be eliminated within a given time, it is assumed that a non-standard signal is being received and a different approach is used to correct the error.

In the present embodiment, a non-standard signal is detected when the detector 78 outputs a selected number, 31 in this example, of consecutive O.P. pulses. As such pulses are generated, the counter 84 eventually reaches a count of 31, whereupon the decoder 88 generates a high level output (N.S.D.) to signify that a non-standard signal is present. N.S.D. is coupled to an OR gate 92 which resets the flip-flop 90 to drive O.P.D.D. low. N.S.D. disables AND gate 94 and enables AND gate 199. It is also coupled to other circuitry, described later, which is used to achieve synchronism with the non-standard signal.

It is important to note that O.P.D.D. goes high only after four consecutive O.P. pulses are generated by the detector 78. Should an in phase condition occur after the second consecutive O.P. pulse, for example, AND gate 94 is enabled for resetting the counter 84 via the OR gate 96.

Similarly, N.S.D. goes high only after 31 consecutive O.P. pulses have been generated by the detector 78. Any I.P. pulse which is generated prior to 31 consecutive O.P. pulses also causes the counter 84 to be reset by the AND gate 94 and the OR gate 96. The advantage of this arrangement is that noise immunity is provided while the system is determining when to change its state or condition.

Assuming that a dynamic phase error has been corrected in the manner described below before 31 O.P. pulses have been counted, the detector 78 outputs the I.P. (in phase) signal to reset counter 84 via the AND gate 94 and OR gate 96. The same I.P. signal also resets the flip-flop 90 via OR gate 92. Consequently, the system returns to standard mode operation. However, if phase correction is not achieved while the O.P.D.D. signal is high, i.e., between O.P. counts of 4 and 31, N.S.D. goes high to signify that incoming syncs are non-standard.

To correct a dynamic phase error, the disclosed embodiment not only determines when such an error is present, it also determines the direction and amount of the dynamic error. To do this, the interval during which the flyback pulse occurs is divided into a plurality of sub-intervals. The sub-interval associated with the leftmost portion of the flyback pulse is identified as F.B.E.L. (flyback extreme left). The midpoint of the flyback pulse is identified as F.B.C. (flyback center). The sub-interval between F.B.C. and F.B.E.L. is referred to as F.B.L. (flyback left); the sub-interval associated with the right-most portion of the flyback is identified as F.B.E.R. (flyback extreme right); and the sub-interval between F.B.C. and F.B.E.R. is referred to as F.B.R. (flyback right). The location of a processed sync (P.S.) pulse is then compared to each of these sub-intervals to determine the direction and extent of phase error. When that determination has been made, appropriate steps are taken to correct the error.

Figure 4:
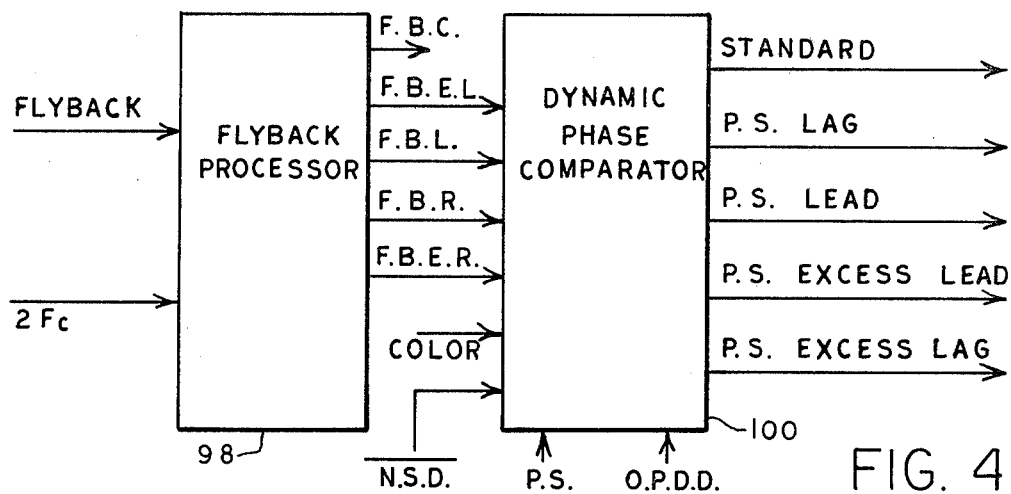

Referring now to FIG. 4, a flyback processor 98 is shown for dividing the flyback interval into the above mentioned sub-intervals. The processor 98 receives the flyback pulse and 2Fc pulses whose frequency is equal to two times 3.58 megahertz. Generally, the processor starts counting the 2Fc pulses when a flyback pulse occurs. After a selected number of counts, the processor outputs the F.B.E.L. signal. When a selected number of additional 2Fc pulses have been counted, the F.B.L. signal is generated. The counting continues and the processor 98 successively generates the F.B.C., F.B.R., and F.B.E.R. signals.

To determine during which sub-interval the P.S. pulse occurs, a dynamic phase comparator 100 receives all the outputs of the processor 98 except F.B.C. The latter output is applied to the coincidence detector 78 of FIG. 3. The comparator 100 also receives the P.S. pulses from the sync processor 15 (FIG. 1), the O.P.D.D. signal from the flip-flop 90 (FIG. 3), and a "color" signal which is high when a color burst is transmitted. The "color" signal may be derived from a conventional color killer (not shown) for use in determining the presence of a "standard" color television signal.

In response to these inputs, the comparator 100 determines in which sub-interval the P.S. pulse occurs. During the extreme left interval (F.B.E.L.) the comparator outputs a signal indicated as "P.S. (processed sync) excessive leading". If the P.S. pulse occurs during one of the other sub-intervals, the comparator outputs signals "P.S. LAG", "P.S. lead", "P.S. excess lead", or "P.S. excessive lag". Herein, the expressions lag, lead, etc. refer to processed sync lagging or leading with respect to flyback center (F.B.C.). As described in more detail hereinafter, these output signals are coupled to AND gates 36, 38, 42, and 44 (FIG. 1) to eliminate the phase error. When a standard signal is received, the comparator 100 also develops the "standard" signal which is applied to the AND gate 40.

Figure 5:
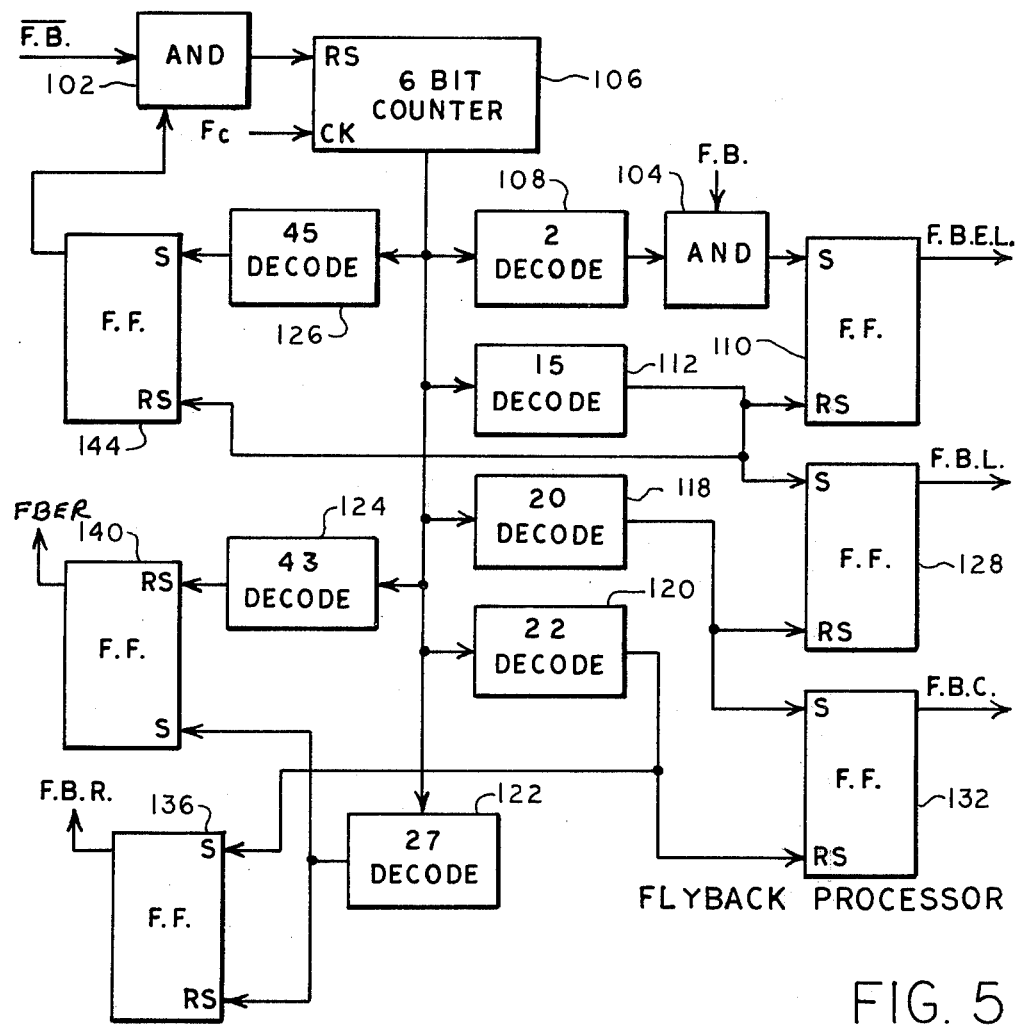
FIG. 5 depicts a preferred embodiment of the flyback processor of FIG. 4.

A preferred embodiment of the flyback processor 98 is shown in FIG. 5. All of the individual components therein are conventional. The inputs to the processor include an $\overline{F.B.}$ (not flyback) pulse applied to an AND gate 102, a flyback (F.B.) pulse applied to another AND gate 104, and a color subcarrier input Fc applied to the clock input of a six bit counter 106. The counter 106 is enabled by the output of the AND gate 102 for counting Fc pulses.

When flyback occurs, the gate 102 removes the reset from the counter 106 so that counting begins. A two count decoder 108 senses when a count of two is attained, and applies a high level pulse to the flyback-enabled AND gate 104. The output of the gate 104 is coupled to the set input of a flip-flop 110. This causes the F.B.E.L. output of the flip-flop 110 to be driven high.

Figure 6:
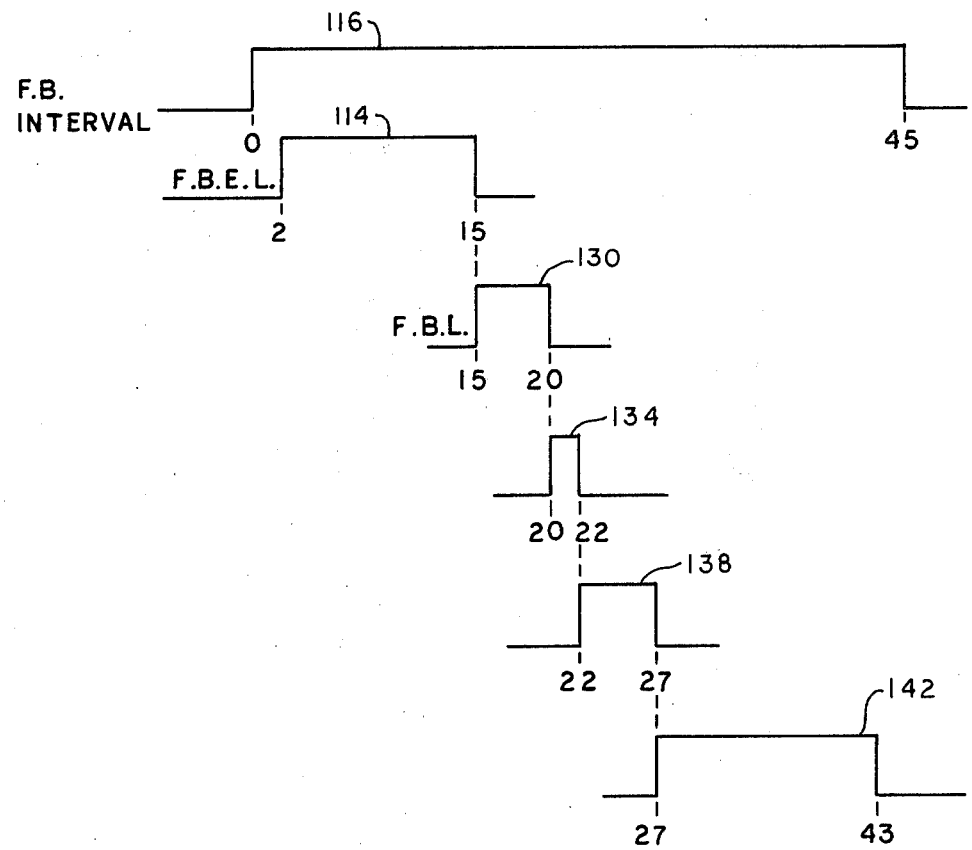
FIG. 6 illustrates how the flyback processor divides the flyback interval into smaller sub-intervals.

When the counter 106 attains a count of 15, this condition is detected by a 15 count decoder 112. The output of this decoder is coupled to the reset input of the flip-flop 110, wherefore the F.B.E.L. pulse is terminated. Thus, as shown in FIG. 6, an F.B.E.L. pulse 114 is developed during the extreme left interval of a flyback interval 116, that is, between Fc counts of 2 and 15.

Returning to FIG. 5, the counter's output is also coupled to a twenty count decoder 118, to a 22 count decoder 120, to a 27 count decoder 122, to a 43 count decoder 124, and to a 45 count decoder 126.

To initiate the F.B.L. pulse, the output of the decoder 112 is coupled to the set input of a flip-flop 128. Hence, when the count of 15 was reached, the output of the flip-flop 128 went high to start the F.B.L. pulse.

When a count of twenty is attained, the decoder 118 develops a high level output which is coupled to the reset input of the flip-flop 128. Consequently, the F.B.L. pulse is terminated. As shown in FIG. 6, the F.B.L. pulse 130 is generated between Fc counts of fifteen and twenty.

To initiate an F.B.C. pulse, the output of the decoder 118 is coupled to the set input of another flip-flop 132. Thus, at a count of twenty, the flip-flop 132 is set to drive F.B.C. high. When a count of 22 is reached, the output of the decoder 120 goes high to reset the flip-flop 132 and drive F.B.C. low. FIG. 6 shows the duration and location of an F.B.C. pulse 134.

The output of the decoder 120 is also coupled to the set input of another flip-flop 136. The reset input of the flip-flop 136 is provided by the output of the decoder 122. Hence, as shown in FIG. 6, the flip-flop 136 develops an F.B.R. pulse 138 between Fc counts of 22 and 27.

To develop an F.B.E.R. pulse, a flip-flop 140 receives a set input from the decoder 122 and a reset input from the decoder 124. Thus, between counts of twenty-seven and forty-three, the flip-flop 140 develops an F.B.E.R. pulse 142 (FIG. 6).

The width of the flyback pulse may vary, but it is desired that the processor 98 divide the flyback interval into sub-intervals of constant durations. For this purpose, another flip-flop 144 receives a reset input from the decoder 112 and a set input from the decoder 126. The output of the flip-flop 144 is applied to one of the inputs of the AND gate 102. When a count of 15 is reached, the decoder 112 resets this flip-flop to drive its output low. Consequently, the AND gate 102 is disabled and the counter 106 is held in a count (not reset) mode. Hence, even if the flyback pulse should be abnormally short, it will not reset the counter 106.

When a count of 45 is reached, the decoder 126 sets the flip-flop 144 to drive its output high. The flyback pulse will normally have terminated at this time so that $\overline{F.B.}$ is also high. This causes the counter 106 to be reset. It can start counting again on the occurrence of the next flyback pulse. With this arrangement, a constant flyback interval is established of 45 counts of Fc.

Figure 7:
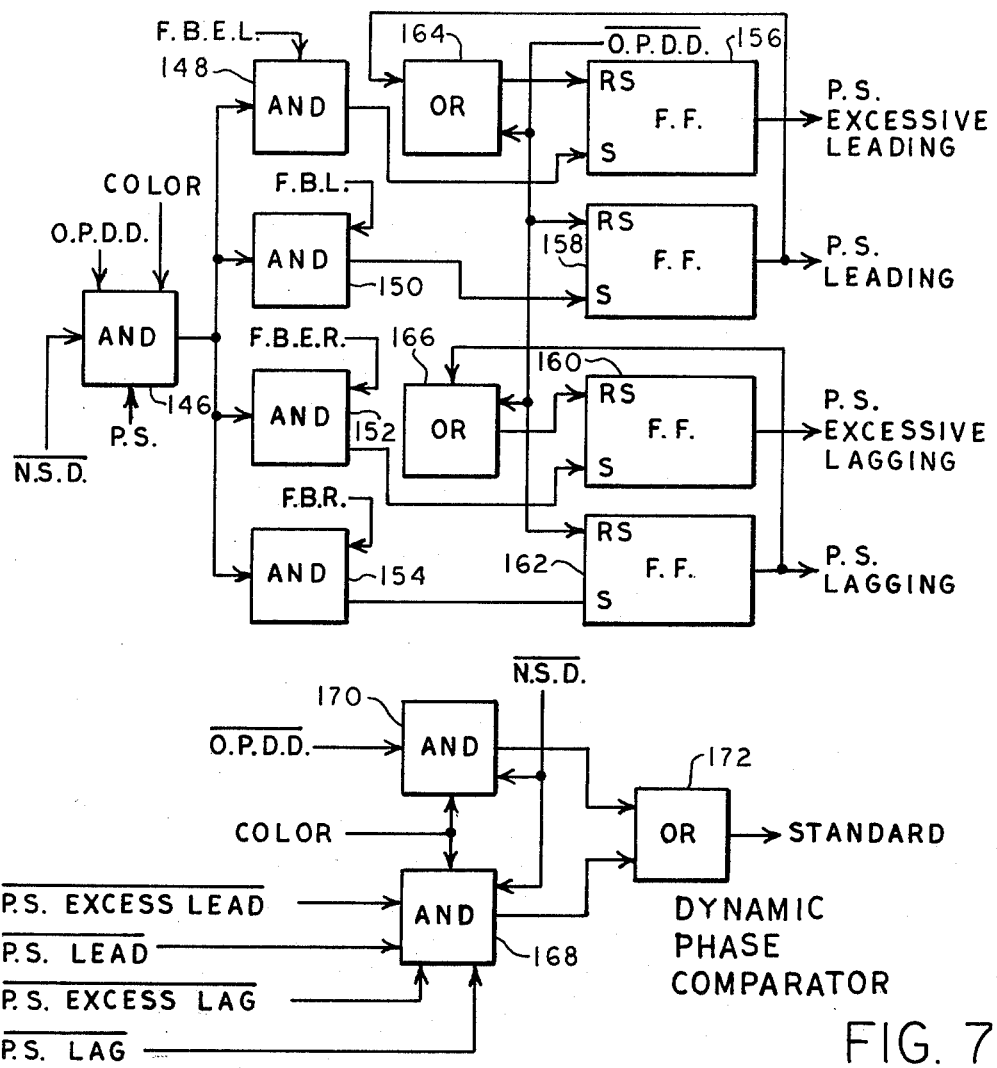
FIG. 7 shows a preferred embodiment of the dynamic phase comparator of FIG. 4.

Referring now to FIG. 7, a preferred embodiment of the dynamic phase comparator is shown. It includes an AND gate 146 which receives the color signal, and pulses P.S., O.P.D.D. and $\overline{N.S.D.}$. The output of the AND gate 146 is applied to four additional AND gates 148, 150, 152 and 154. The signals F.B.E.L., F.B.L., F.B.E.R., and F.B.R. developed by the flyback processor are applied to gates 148, 150, 152 and 154, respectively. The outputs of these gates are applied to the set inputs of flip-flops 156, 158, 160 and 162, respectively. An OR gate 164 receives the signal $\overline{O.P.D.D.}$ and the output of the flip-flop 158 for driving the reset input of the flip-flop 156. Another OR gate 166 receives the signal $\overline{O.P.D.D.}$ and the output of the flip-flop 162 for driving the reset input of the flip-flop 60. The reset inputs of flip-flops 158 and 162 receive the signal $\overline{O.P.D.D.}$.

Assuming now that a color signal is being received and that a dynamic phase error occurs, O.P.D.D., $\overline{N.S.D.}$ and color are all high to enable the AND gate 146. The next P.S. pulse is then applied via the gate 146 to AND gates 148, 150, 152 and 154. If F.B.E.L. goes high while the gate 148 receives the P.S. pulse, it sets the flip-flop 156 to generate the signal "P.S. Excessive Leading". Should the P.S. pulse arrive during any one of the other sub-intervals, flip-flops 158, 160 or 162 will be set to develop one of the signals "P.S. Leading", "P.S. Excessive Lagging" or "P.S. Lagging".

If the P.S. pulse occurs during the extreme left of the flyback interval, the output of flip-flop 156 is used to reduce the phase error as described below. The next P.S. pulse may then occur during the left fly-back interval, in which case the output of the flip-flop 158 is used to eliminate the phase error and to reset the flip-flop 156. Should the P. S. pulse be in the extreme right of the flyback interval, the flip-flops 160 and 162 eliminate the phase error in the same manner. It can be seen, therefore, that the dynamic phase comparator determines not only the direction of phase error (leading or lagging), but the amount of any such error.

The phase comparator also includes the circuitry for sensing when a "standard" signal is received. This circuit includes AND gates 168 and 170 and an OR gate 172. The AND gate 168 receives the inverted outputs of the flip-flops 156, 158, 160 and 162. It also receives the "color" signal and $\overline{N.S.D.}$. When all its inputs are high, the gate 168 develops a high output which the OR gate 172 translates to the "standard" signal.

The AND gate 170 receives $\overline{O.P.D.D.}$, $\overline{N.S.D.}$ and the color signal. When color is present, when no dynamic phase error is sensed, and when a non-standard signal is not detected, all inputs to the gate 170 are high. Hence, the gate 170 develops a high level output to the OR gate 172 to develop the "standard" signal. That signal is applied to the AND gate 40 (FIG. 1) to place the system in its standard operating mode.

Referring to FIG. 1, if the dynamic phase error is "excessive leading", the AND gate 36 is enabled. Thus, when the counter 18 reaches a count of 450, the decoder 22 develops an output pulse which the OR gate 52 translates to a 2H pulse at terminal 16. The counter 18 is thus reset five counts sooner than normal to begin counting anew. This quickly reduces the dynamic phase error by about 0.7 microseconds per line.

When the flyback pulse shifts so that the P.S. pulse is within the F.B.L. intervals, a "P.S. leading" signal enables the AND gate 38. When the counter 18 reaches a count of 454, the decoder 24 develops an output pulse which the OR gate 52 translates to another 2H pulse. The counter 18 is reset at this time. This operation shifts the phase of the 2H pulses and the flyback pulse further, reducing the dynamic phase error by about 0.14 microseconds per line. Eventually, the flyback center pulse will be aligned with the P.S. pulse. When that occurs, the detector 78 (FIG. 3) provides an I.P. pulse. This pulse is applied, via OR gate 92, to the reset input of flip-flop 90 for driving O.P.D.D. low, and via AND gate 94 and OR gate 96, to the reset input of the counter 84. In addition, the low state of O.P.D.D. disables AND gate 146 (FIG. 7) and causes flip-flops 156, 158, 160 and 162 to be reset. The OR gate 172 now develops its standard output to enable AND gate 40 (FIG. 1). Thus, the system returns to standard operation after having corrected the dynamic phase error.

In an excessive dynamic phase lag is detected, the AND gate 44 is enabled and the phase error is reduced in a manner similar to that described above. When the phase error is reduced to merely "lagging", the AND gate 42 is enabled to eliminate the phase error. Standard operation follows.

From the foregoing description, it will be appreciated that dynamic phase errors are reduced by first "pulling in" the phase of the 2H pulses by a relatively large amount, and then further "pulling in" by a smaller amount to achieve precise phase lock.

System operation will now be described for the case in which a non-standard signal is detected. Such a situation occurs most often when the composite sync is supplied by a non-standard signal source, i.e., a source whose color subcarrier frequency is not equal to 227.5 times its horizontal frequency.

When a non-standard signal is received, the flip-flop 90 (FIG. 3) will first drive O.P.D.D. high. The phase comparator (FIG. 7) may then attempt to correct the error. Alternately, the phase error may be so great that the P.S. pulse is not within the flyback interval. In the latter case, the outputs of flip-flops 156, 158, 160 and 162 will remain low. Consequently, the AND gate 168 and the OR gate 172 output the "standard" indication. The counter 18 is reset every 455th count, and detector 78 keeps outputting O.P. pulses to counter until it counts 31 O.P. pulses. The decoder 88 then drives N.S.D. high to signify the presence of a non-standard signal. AND gates 168 and 170 (FIG. 7) become disabled to drive the "standard38 signal low. Also, AND gate 146 is disabled to inhibit operation of the dynamic phase comparator. As a result, AND gates 36, 38, 40, 42 and 44 (FIG. 1) are disabled. The AND gate 50 is enabled by virtue of N.S.D. being high. The system is now conditioned to start eliminating the phase error by means of an analog phase detector.

Synchronization between the flyback pulse and the non-standard composite sync is achieved by the use of a conventional analog phase detector 174 (FIG. 1) in a phase locked loop. The loop also includes a conventional analog APC filter 176, an error amplifier 178, a capacitor 180, and a comparator 182. Associated with the phase locked loop is an OR gate 184, a flip-flop 186, and a capacitor discharge network 188. The network 188 may include merely a transistor switch in series with a resistor, both of which normally shunt the capacitor 180 to keep it discharged. When the network 188 is disabled, the switch opens to permit the capacitor 180 to charge.

In general, the comparator 182 develops a phase shifted output pulse identified as H.C.N.S. (horizontal correction non-standard) after the decoder 34 senses that the counter 18 has reached a count of 440 and when a non-standard signal is present. The H.C.N.S. pulses are coupled to the OR gate 52 when the AND gate 50 is enabled by N.S.D. In that circumstance, the 2H pulses at terminal 16 are developed in response to the H.C.N.S. pulses and the counter 8 is reset by those pulses. When the counter 18 reaches another count of 440, the comparator 182 begins to develop another H.C.N.S. pulse.

More specifically, the phase detector 174 receives the CS (composite sync) pulses and sawtooth waveforms, the latter of which are conventionally derived from the flyback pulse. The detector 174 senses the phase relationship between the sawtooth and C.S. and develops an output representative of that relationship. Its output is filtered by the APC filter 176 to develop an APC voltage representative of any phase error. That voltage is coupled to the error amplifier 178 which converts the APC voltage to a current for charging the capacitor 180. Because that charging current is a function of phase error, the capacitor 180 charges (when not shunted by the network 188) at a rate representative of phase error.

The comparator 182 receives first and second D.C. reference voltages and compares them to the voltage on the capacitor 180. The amplitude of the first D.C. reference voltage is selected to establish when the H.C.N.S. pulse is to be initiated; and the second D.C. reference voltage is selected to establish when the H.C.N.S. pulse is to terminate.

Figure 8:
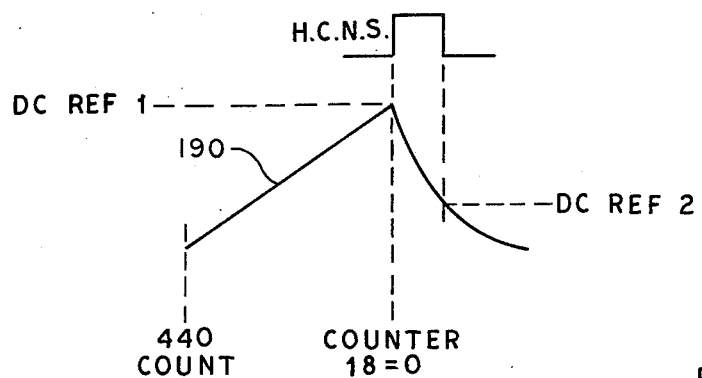
FIG. 8 shows waveforms useful in describing the operation of the comparator in FIG. 1.

Referring briefly to FIG. 8, the voltage waveform 190 represents the voltage across the capacitor 180. When that voltage equals the first D.C. reference, the comparator 182 initiates the H.C.N.S. pulse. That pulse is coupled to the OR gate 48 to develop an output pulse at terminal 16 and to reset the counter 18. The H.C.N.S. pulse is also coupled to the OR gate 184 to reset the flip-flop 186. This enables the discharge network 188 which now shunts the capacitor 180 to discharge it. When the capacitor 180 discharges to the level of the second D.C. reference (see FIG. 8), the comparator 182 terminates the H.C.N.S. pulse.

The counter 18 is, of course, now counting. When it reaches another count of 440, the decoder 34 sets the flop-flop 186 to remove the shunt across the capacitor 180. Consequently, the capacitor begins charging again to develop another H.C.N.S. pulse. This cycle continues for each television line, continuously adjusting the phase of the H.C.N.S. pulse until phase lock is achieved between the flyback pulse and the non-standard composite sync.

It bears emphasizing that the leading edge of the H.C.N.S. pulse is not developed in response to any clock pulse. Rather, its position varies continuously as a function of phase error, thereby achieving phase lock with a non-standard signal.

Referring to the decoder 32, it is included to ensure that output pulses are generated at the terminal 16 even if the phase locked loop should fail. In that event, the counter 18 will not be receiving reset pulse, HCNS, before it attains a count of 470. When that count occurs, the decoder 32 provides an output pulse to the OR gate 52 via gates 48 and 50, to reset the counter 18. This ensures that terminal 16 continues to receive pulses for use in developing flyback pulses, high voltage and non-synchronized horizontal and vertical scan.

While the phase locked loop is in operation, the television signal may return to "standard". In that event, it is desirable for the system to return to its standard mode of operation. This is achieved by the operation of a coincidence detector 192 (FIG. 3), and AND gate 194, a counter 196, and a 7 count decoder 198.

The detector 192 receives the H.C.N.S. pulses and the output of the 455 decoder 26. When coincidence between these inputs is sensed, the detector 192 provides an I.P.N.S. (in phase non-standard) pulse. When a lack of coincidence is detected, an O.P.N.S. pulse is outputted by the detector 192. For each P.S. pulse, the detector 192 outputs one high level pulse.

The AND gate 194 receives the I.P.N.S. output of the detector 192 and the N.S.D. signal generated by the decoder 88. The counter 196 receives the output of the AND gate 194 at its clock input and the signal O.P.N.S. at its reset input.

N.S.D. was and still is high, and no O.P.N.S. pulse is provided by detector 192. The AND gate 194 is, therefore, enabled and the counter 196 is clocked each time the detector 192 senses coincidence. If an O.P.N.S. pulse is not provided by the detector 192 while seven consecutive I.P.N.S. pulses are provided, the decoder 198 senses the 7 count in the counter 196 and develops a high level signal identified as S.D. (standard detected). Of course, if an O.P.N.S. pulse arrives before a count of 7 is attained, the counter 196 becomes reset.

The S.D. signal generated by decoder 198 signifies that a standard television signal is being received. To bring the system back into its standard mode of operation, S.D. is coupled to an AND gate 199 to enable it. The next (8th) I.P.N.S. pulse is coupled via the AND gage 199 and the OR gate 96 to the reset input of the counter 84 to reset it to a count of zero. Consequently, the decoder 88 drives N.S.D. low, AND gate 199 becomes disabled, and AND gate 94 is enabled. As long as phase synchronization is maintained, the detector 78 keeps providing I.P. pulses to continue resetting the counter 84 via the AND gate 94 and the OR gate 96. In addition, the phase comparator 100 holds the "standard" signal high to enable the AND gate 40 (FIG. 1). Normal or standard mode operation is thus resumed.

Figure 9:
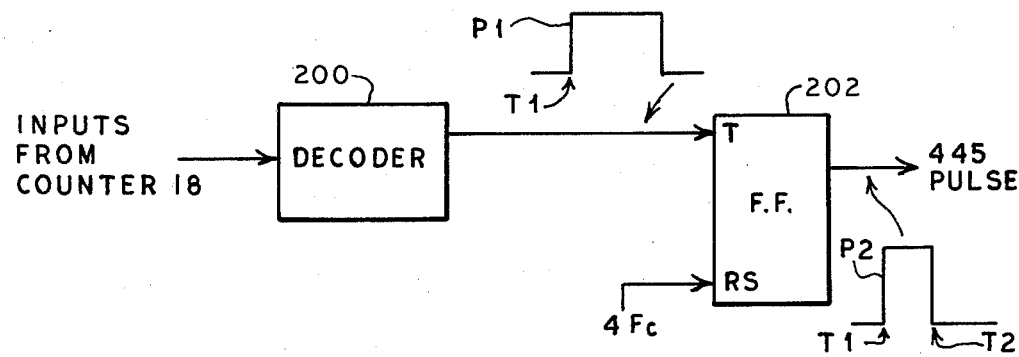
FIG. 9 shows how the decoders of FIG. 1 may be implemented.

In the various figures, the individual gates, counters and other components may be of conventional design. One precaution should be observed, however. The outputs of the decoders shown in FIG. 1 should be in the form of relatively narrow pulses so that the counter 18 is not held in a reset mode while it should be counting. FIG. 9 shows one way of narrowing the decoder's outputs, if necessary.

As shown, an exemplary decoder 200 senses the output of the counter 18 and develops at time T1, a relatively wide pulse output P1. To narrow the pulse P1, it may be applied to the toggle input of a flip-flop 202. The reset input of the flip-flop 202 may receive 4Fc pulses. With this arrangement, the flip-flop's output (P2) goes high at time T1 and is reset low by the next 4Fc pulse at time T2. The narrow pulse P2 may then be applied to an AND gate as shown in FIG. 1. All the decoders 22, 24, 26, 28, 30, 32 and 34 may be constructed in this manner.

One important advantage of the horizontal countdown system described above is that it eliminates the need for a horizontal oscillator. Moreover, it achieves precise phase lock between composite sync and the receiver's flyback pulses even when a non-standard television signal is received. When a standard signal is received, the system achieves phase lock with the noise immunity associated with digital countdown systems, and provides dynamic phase error correction. Hence, this invention makes it more commercially feasible to replace the conventional horizontal analog circuitry in a television receiver with a digital horizontal countdown system.

The invention has been described in terms of preferred structure, preferred decoding states and the like. However, it will be obvious to those skilled in the art that many alterations and modifications may be made without departing from the invention. Accordingly, it is intended that all such modifications and alterations be included within the spirit and scope of the invention as defined by the appended claims.

What is claimed is:

1. In a television receiver which receives composite sync and which supplies a color oscillator signal and a flyback pulse to a horizontal countdown system for use in generating horizontal scan drive pulses, an improved horizontal countdown system, comprising:

a counter for counting the cycles of the color oscillator signal;

a plurality of decoders, each of which senses a different selected state of the counter for developing a decoder output pulse in response to such sensing, one of said decoders being a standard decoder selected to sense a standard state indicative of a standard relationship between the frequency of the color oscillator signal and the frequency of the composite sync;

gate means having an input for receiving input pulses and an output at which each input pulse is translated to a horizontal scan drive pulse;

error detection means receiving the flyback pulse and a signal representative of composite sync for sensing their relative phases, for developing a "standard" signal when the signal representing composite sync is in phase with the flyback pulse, and for developing a "non-standard" signal when non-standard composite sync is sensed;

means responsive to the "standard" signal for coupling the standard decoder's output pulse to the input of said gate means so as to develop a horizontal scan drive pulse;

means coupling each horizontal scan drive pulse to the counter for resetting the counter;

phase correction means including an analog phase locked loop responsive to the composite sync and the flyback pulse for sensing phase error therebetween and for generating a phase-corrected pulse; and means responsive to the "non-standard" signal for deselecting the standard decoder and for coupling the phase-corrected pulse to the input of said gate means so as to reset the counter and develop a horizontal scan drive pulse which is phase locked to composite sync.

2. A system as set forth in claim 1 wherein said phase locked loop includes a capacitor, means for charging the capacitor at a rate dependent on the phase difference between the flyback pulse and composite sync, and means responsive to the capacitor being charged to a predetermined voltage for initiating the phase-corrected pulse such that the phase-corrected pulse changes phase until it is phase locked to composite sync.

3. A system as set forth in claim 1 wherein said phase locked loop includes a phase detector for developing a control voltage indicative of the phase difference between the flyback pulse and composite sync, a capacitor, means for charging the capacitor in response to the control voltage, and a comparator receiving a reference voltage and sensing the charge on the capacitor for initiating the phase-corrected pulse when the capacitor charges to the reference voltage.

4. A system as set forth in claim 3 wherein said decoders include a plurality of decoders for sensing counter states lower than standard and a plurality of decoders for sensing counter states higher than standard, and wherein said capacitor charging means is responsive to a selected decoder sensing a counter state less than standard for initiating capacitor charge.

5. A system as set forth in claim 4 including a detector receiving the phase-corrected pulse and the output pulse from the standard decoder for sensing phase coincidence therebetween, and means responsive to a detection of such phase coincidence for removing the phase-corrected pulse from the input of said gate means and for coupling the output of the standard decoder to the input of said gate means, whereby horizontal scan drive pulses are developed in response to the standard decoder rather than the phase correction means.

6. A system as set forth in claim 1 wherein said error detection means includes means for detecting the extent and direction of dynamic phase error between composite sync and the flyback pulse and for generating a dynamic phase error signal in response to such detection, and further including decoder selection means responsive to the dynamic phase error signal for deselecting the standard decoder and for successively coupling the outputs of selected other decoders to said gate means so as to reduce and eliminate the dynamic phase error.

7. A system as set forth in claim 6 wherein the decoders include a plurality of decoders for sensing counter states lower than standard and a plurality of decoders for sensing counter states higher than standard, wherein said error detection means senses leading and lagging phase errors, and wherein said decoder selection means responds to the detection of a lagging phase error for coupling the output of at least one of the decoders which senses a counter state higher than standard to the input of the gate means, and the decoder selection means responds to the detection of a leading phase error for coupling the output of at least one of the decoders which senses a counter state lower than standard to the input of the gate means so as to pull the horizontal drive scan pulses into phase with composite sync.

8. A system as set forth in claim 6 wherein the decoders include a first decoder for sensing a first counter state lower than standard, a second decoder for sensing a counter state between standard and the first state, a third decoder for sensing a third counter state higher than standard, and a fourth decoder for sensing a fourth counter state higher than the third counter state, wherein said error detection means develops signals representative of excessive leading phase error, leading phase error, lagging phase error and excessive lagging phase error, and wherein said decoder selection means responds to the signals representing excessive leading, leading, lagging and excessive lagging phase error for coupling the outputs of the first, second, third and fourth decoders, respectively, to the input of said gate means.

9. In a television receiver which receives composite sync and which supplies a color oscillator signal and a flyback pulse to a horizontal countdown system for use in generating horizontal scan drive pulses, an improved horizontal countdown system, comprising:

a counter for counting the cycles of the color oscillator signal;

a standard decoder coupled to the counter for developing a decoder output pulse when the counter reaches a standard counter state indicative of a standard relationship between the frequency of the color oscillator signal and the frequency of the composite sync;

a plurality of additional decoders for developing decoder output pulses in response to the counter being in states higher than and lower than standard;

gate means having an input for receiving input pulses and an output at which each input pulse is translated to a horizontal scan drive pulse;

error detection means receiving the flyback pulse and a signal representative of composite sync for sensing their relative phases, for developing a "standard" signal when the signal representing composite sync is in phase with the flyback pulse, for developing a "non-standard" signal when a non-standard composite sync is sensed, and for developing a dynamic error signal when a dynamic phase error is sensed;

decoder selection means responsive to the "standard" signal for coupling the standard decoder's output to the input of the gate means, responsive to the dynamic error signal for deselecting the standard decoder and for selecting one of the other decoder's outputs for coupling to the input of the gate means, and responsive to the "non-standard" signal for deselecting all said decoders, thereby causing a horizontal scan drive pulse to be developed in response to a decoder output when either a "standard" signal or a dynamic phase error signal is developed;

means coupling each horizontal scan drive pulse to the counter for resetting the counter;

phase correction means including an analog phase locked loop responsive to flyback information and the composite sync for sensing phase error therebetween and for generating a phase-corrected pulse; and means responsive to the "non-standard" signal for coupling the phase corrected pulse to the input of said gate means so that the counter is reset and a horizontal scan drive pulse is developed which is phase locked to composite sync.

10. A system as set forth in claim 9 wherein the frequency of the color oscillator signal is selected to be four times the nominal color subcarrier frequency and said standard decoder is selected to sense a counter state of 455.

11. A system as set forth in claim 9 wherein the additional decoders include a first decoder for sensing a first counter state lower than standard, a second decoder for sensing a second counter state between standard and the first state, a third decoder for sensing a third counter state higher than standard, and a fourth decoder for sensing a fourth counter state higher than the third counter state, wherein the dynamic error signal developed by the error detection means includes an indication of the direction and extent of dynamic phase error, and wherein said decoder selection means responds to the dynamic error signal by selecting the output of at least one of said four decoders for input to said gate means on the basis of the extent and direction of the dynamic phase error.

12. A system as set forth in claim 9 wherein said error detection means includes:
a detector for sensing the phase relationship between flyback and sync, for developing an out of phase pulse when a lack of phase coincidence is sensed, and for developing an in phase pulse when phase coincidence is sensed;
a second counter for counting the out of phase pulses;
means for sensing when the second counter has reached a selected count and for generating an output signal indicative of such sensing; and
a dynamic error signal generator responsive to the output signal for generating the dynamic error signal.

13. A system as set forth in claim 12 wherein the error detection means includes means for sensing when the second counter reaches a count greater than said selected count for generating the "non-standard" signal.

14. A system as set forth in claim 12 wherein said dynamic error signal generator includes a processor receiving the flyback pulse for dividing the interval of the flyback pulse into sub-intervals and for generating output signals representative of the occurrence of each sub-interval, and a phase comparator receiving the output signals from the processor and the signal representative of composite sync for generating a dynamic phase error signal indicative of which sub-interval the signal representative of composite sync occurs in.

* * * * *